United States Patent
De Angelis et al.

(10) Patent No.: US 11,196,797 B2
(45) Date of Patent: Dec. 7, 2021

(54) TRANSFERRING FILES BETWEEN COMPUTER NODES ON DIFFERENT NETWORKS

(71) Applicant: International Business Machines Corporation, Armonk, NY (US)

(72) Inventors: Fabio De Angelis, Rome (IT); Stefano Sidoti, Rome (IT); Andrea Napoleoni, Arsoli (IT); Luca Balestrazzi, Rome (IT)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 16/107,519

(22) Filed: Aug. 21, 2018

(65) Prior Publication Data

US 2020/0068005 A1 Feb. 27, 2020

(51) Int. Cl.
*H04L 29/08* (2006.01)
*H04L 12/741* (2013.01)
*H04L 12/751* (2013.01)
*H04L 12/46* (2006.01)
*H04L 12/721* (2013.01)

(52) U.S. Cl.
CPC .............. *H04L 67/06* (2013.01); *H04L 45/02* (2013.01); *H04L 45/745* (2013.01); *H04L 12/462* (2013.01); *H04L 12/4641* (2013.01); *H04L 45/26* (2013.01); *H04L 45/34* (2013.01); *H04L 45/566* (2013.01)

(58) Field of Classification Search
CPC ..... H04L 67/06; H04L 45/745; H04L 12/462; H04L 12/4641; H04L 45/02; H04L 45/26; H04L 45/34; H04L 45/566
See application file for complete search history.

(56) References Cited

U.S. PATENT DOCUMENTS

| | | | |
|---|---|---|---|
| 6,968,370 B2 | 11/2005 | Wu | |
| 7,024,467 B2 | 4/2006 | Rosensteel et al. | |
| 8,181,114 B2 | 5/2012 | Saka | |
| 8,782,174 B1 | 7/2014 | Dotan et al. | |

(Continued)

FOREIGN PATENT DOCUMENTS

EP 0566895 B1 5/1999

OTHER PUBLICATIONS

"Moving and Copying Files and Text Between Virtual Machines and Your Mac," VMware Fusion 7 Documentation Center, 1 page. https://pubs.vmware.com/fusion-7/index.jsp?topic=%2Fcom.vmware.fusion.help.doc%2FGUID-3C0EA5DA-98DD-4835-9C84-354472B25303.html.

(Continued)

*Primary Examiner* — Philip J Chea
*Assistant Examiner* — Ruth Solomon
(74) *Attorney, Agent, or Firm* — Yee & Associates, P.C.

(57) ABSTRACT

Transferring files between computer nodes located on different networks is provided. A path for transferring a file to a target node located on a different network is determined. The path includes an address of the target node and a set of one or more addresses of intermediate network bridge nodes connecting the different networks. At least one command to be executed to transfer the file to a specific node present in the path is determined. A file transfer command record is generated. The file transfer command record includes the path and the at least one command to be executed to transfer the file to the specific node present in the path.

17 Claims, 6 Drawing Sheets

(56) References Cited

U.S. PATENT DOCUMENTS

| | | | | |
|---|---|---|---|---|
| 10,165,488 B2* | 12/2018 | Demchenko | ......... | H04W 36/26 |
| 10,547,547 B1* | 1/2020 | Singh | ................... | H04L 49/252 |
| 2006/0184784 A1 | 8/2006 | Shani | | |
| 2010/0115128 A1* | 5/2010 | Burnett | ................ | G06F 3/0608 |
| | | | | 709/239 |
| 2011/0122878 A1* | 5/2011 | Li | .......................... | H04L 45/04 |
| | | | | 370/400 |
| 2013/0262660 A1* | 10/2013 | Theroux | ................ | H04L 45/22 |
| | | | | 709/224 |
| 2014/0365682 A1* | 12/2014 | Morris | ................... | H04L 45/02 |
| | | | | 709/238 |
| 2015/0277704 A1 | 10/2015 | Patel et al. | | |
| 2016/0174061 A1* | 6/2016 | Chetlur | ................ | H04W 84/18 |
| | | | | 455/422.1 |
| 2017/0366445 A1* | 12/2017 | Nemirovsky | ........... | H04L 45/24 |
| 2017/0367023 A1* | 12/2017 | Demchenko | ............ | H04L 45/28 |
| 2018/0024857 A1* | 1/2018 | Twitchell, Jr. | ........ | H04L 47/125 |
| | | | | 718/1 |
| 2018/0309636 A1* | 10/2018 | Strom | ................... | H04L 41/147 |

OTHER PUBLICATIONS

Mir, "Transfer on LAN: Easily Transfer Files Between Systems Running Different OS in Network," Addictive Tips, Nov. 3, 2011, 4 pages. https://www.addictivetips.com/windows-tips/transfer-on-lan-easily-transfer-files-between-systems-running-different-os-in-network/.

Hoffman, "How to Share Your Computer's Files With a Virtual Machine," How-To Geek, LLC, Jul. 21, 2017, 7 pages. https://www.howtogeek.com/189974/how-to-share-your-computers-files-with-a-virtual-machine/.

* cited by examiner

TRANSFERRING FILES BETWEEN COMPUTER NODES ON DIFFERENT NETWORKS

BACKGROUND

1. Field

The disclosure relates generally to computer networks and more specifically to transferring files between computer nodes located on different networks.

2. Description of the Related Art

In a computer network, multiple computers are connected together and are known as nodes. A network may be established via hard-wired interconnection between a plurality of computers in a local network or via telecommunication or wireless links on a wider scale, such as the Internet. Often it is desirable to transfer files between computers. A file transfer is the process of transferring or moving any type of computer file or data object from one computer to another. A computer file contains specific data stored on a computer. This data may be anything from an executable program to a user-created document. A computer file is typically made up of a name, which represents the file's identity, and an extension that tells the operating system what type of file it is. Computers involved in file transfers are source or sending computers and target or receiving computers.

Methods for transferring files between different computers may be either offline file transfers or online file transfers. Offline data transfers rely on a person manually transferring files from one computer to another using magnetic or optic data storing means, for example. However, offline data transfer is slow and inefficient in terms of time and effort required. In addition, if the computers are in different geographic locations, then manual file transfer may not be practical or even possible.

Online file transfers are the most common form of file transfer. File transfer protocol is a standard network protocol used for transferring a computer file between the computers. Typically, a user of a source computer selects a file for transfer and then selects a drive or folder on a target computer to receive the file. Current online file transfer methods allow this file transfer between the two computers but only when the two computers are either physically connected (e.g., via universal serial bus) or connected to a same network.

SUMMARY

According to one illustrative embodiment, a computer-implemented method for transferring files between computer nodes located on different networks is provided. A path for transferring a file to a target node located on a different network is determined. The path includes an address of the target node and a set of one or more addresses of intermediate network bridge nodes connecting the different networks. At least one command to be executed to transfer the file to a specific node present in the path is determined. A file transfer command record is generated. The file transfer command record includes the path and the at least one command to be executed to transfer the file to the specific node present in the path. According to other illustrative embodiments, a computer system and computer program product for transferring files between computer nodes located on different networks are provided.

DETAILED DESCRIPTION

Figure 1:
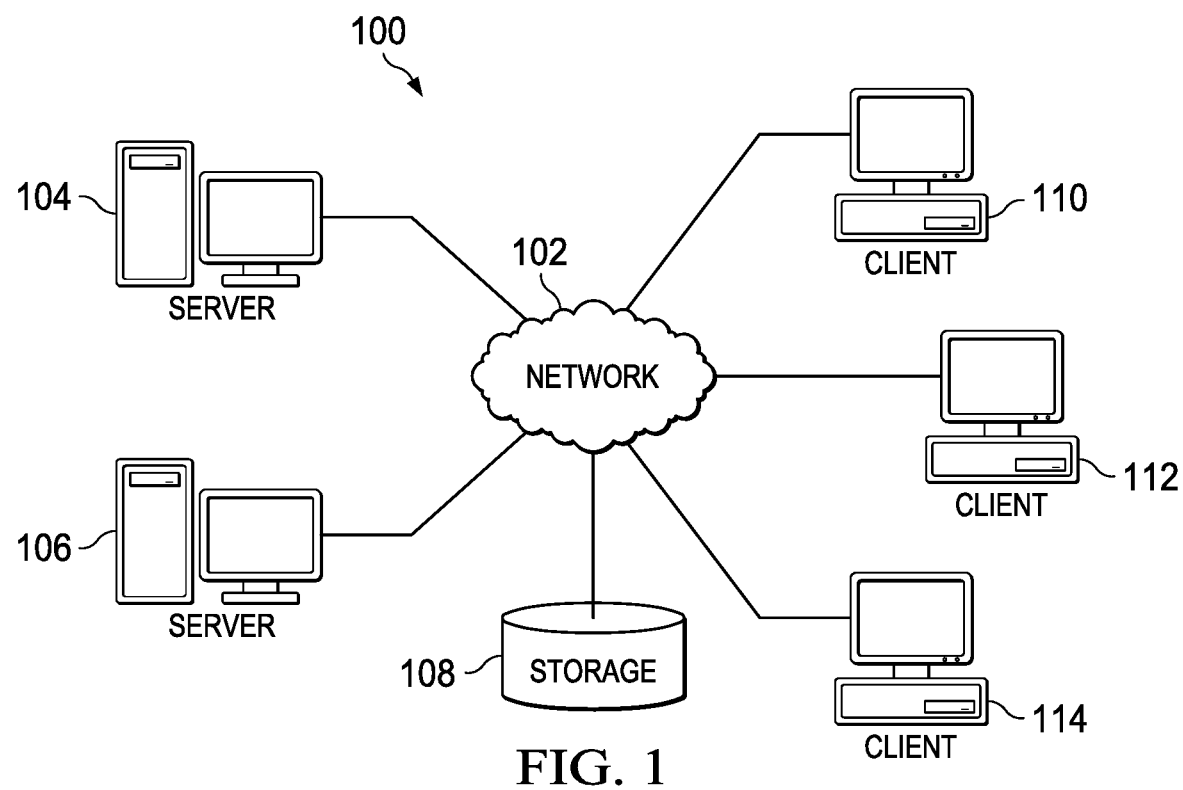
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
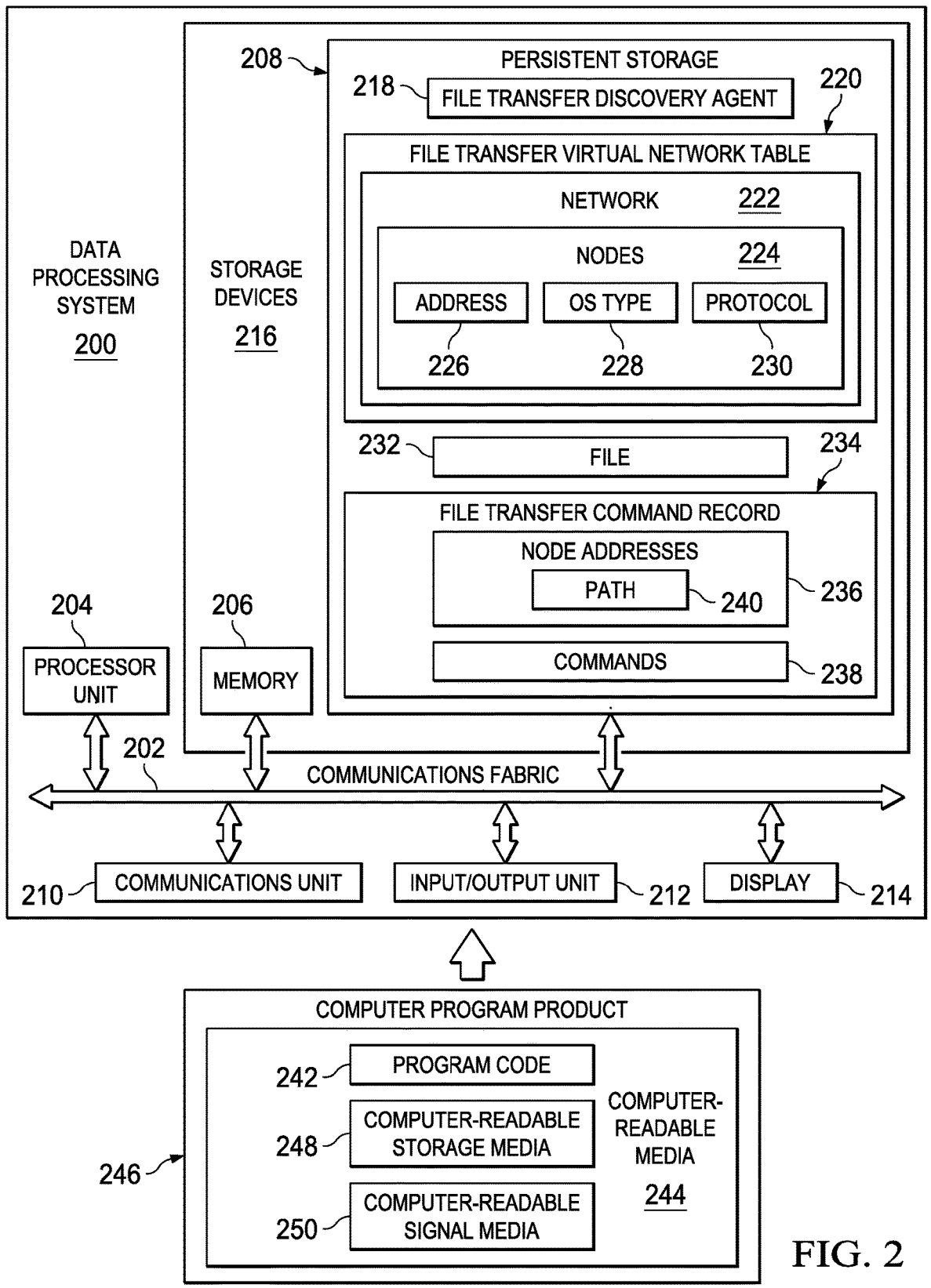
FIG. 2 is a diagram of a data processing system in which illustrative embodiments may be implemented.
Figure 3:
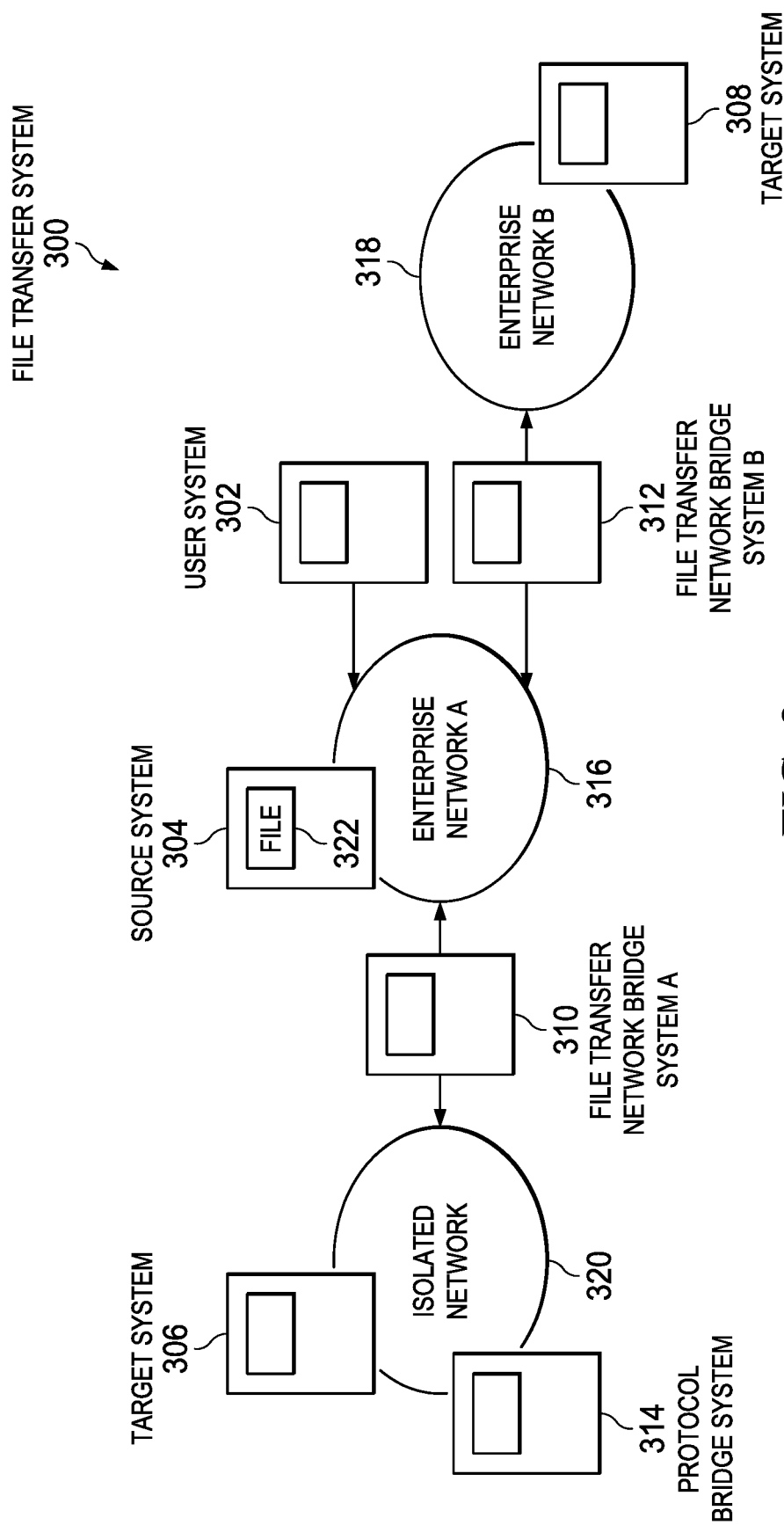
FIG. 3 is a diagram illustrating an example of a file transfer system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 may be a file server that stores a plurality of different files for an enterprise or organization, for example. Further, server 106 may be, for example, a file transfer bridge that is connected to another network in addition to being connected to network 102. Furthermore, server 104 and server 106 may each represent a cluster of servers. Alternatively, server 104 and server 106 may represent computing nodes in a cloud environment.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, and the like, with wire or wireless communication links to network 102.

Users of clients 110, 112, and 114 may utilize clients 110, 112, and 114 to initiate a file transfer operation. For example, a user of client 110 may initiate the transfer of a file from file server 104 to a target computer system, which is connected to network bridge server 106 via another network. However, it should be noted that the user of client 110 may initiate a file transfer from client 110, itself, to the target computer system or a user of file server 104 may initiate the file transfer directly from file server 104 to the target computer system.

Storage 108 is a network storage device capable of storing any type of data in a structured format or an unstructured format. In addition, storage 108 may represent a plurality of network storage devices. Further, storage 108 may store identifiers and IP addresses for a plurality of client devices, a plurality of file servers, a plurality of network bridges, and a plurality of target computer systems; identifiers for a plurality of networks; identifiers for a plurality of users; and the like. Furthermore, storage unit 108 may store authentication or credential data that may include user names, passwords, and biometric data associated with users and system administrators, for example.

In addition, it should be noted that network data processing system 100 may include any number of additional servers, clients, storage devices, other devices, and networks not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores file transfer discovery agent 218. However, it should be noted that even though file transfer discovery agent 218 is illustrated as residing in persistent storage 208, in an alternative illustrative embodiment file transfer discovery agent 218 may be a separate component of data processing system 200. For example, file transfer discovery agent 218 may be a hardware component coupled to communication fabric 202 or a combination of hardware and software components.

File transfer discovery agent 218 controls the process of transferring data files between computer nodes, which are located on different networks, separated by firewalls, contained in different virtual environments, and the like. File transfer discovery agent 218 performs a network discovery scan operation to identify all computer nodes, along with their corresponding network connections, operating system types, and protocols for transferring data files or objects to other computer nodes or devices. Based on the information collected during the network discovery scan operation, file transfer discovery agent 218 generates file transfer virtual network table 220.

File transfer virtual network table 220 lists network 222. Network 222 represents a set of one or more networks that data processing system 200 is connected to. Network 222 contains nodes 224. Nodes 224 represent a listing of a plurality of computer systems, machines, or devices within each network in the set of one or more networks represented by network 222. Each node in nodes 224 corresponds to address 226, operating system type 228, and protocol 230.

Address 226 may be, for example, an internet protocol address that identifies a particular node in nodes 224. Operating system type 228 is the kind of operating system that that particular node in nodes 224 is using to function. Protocol 230 represents the type of protocol, such as a file transfer protocol, a secure copy protocol, and the like, that that particular node in nodes 224 is using to transfer a data file to a target node in nodes 224. File transfer discovery agent 218 links the different operating system types with the different protocols.

After generating file transfer virtual network table 220, file transfer discovery agent 218 shares file transfer virtual network table 220 with nodes 224. Further, file transfer discovery agent 218 receives file transfer virtual network tables from other nodes in nodes 224. After receiving file transfer virtual network tables from other nodes, file transfer discovery agent 218 merges or combines the information contained in the received tables with its own local table to create a global file transfer virtual network table containing information for a plurality of networks and their corresponding computer nodes.

In response to receiving a user input to transfer file 232 from data processing system 200 to a target node in nodes 224, file transfer discovery agent 218 generates file transfer command record 232 using the merged information contained in file transfer virtual network table 220. File 232 may represent any type of computer file or data object that may be transferred from one computer system to another. In this example, file transfer command record 232 includes node addresses 236 and commands 238.

Node addresses 236 represent, for example, internet protocol addresses for a plurality of nodes in nodes 224 that form path 240 from data processing system 200 (i.e., the source computer system), to a set of one or more intermediate computer systems (i.e., one or more network bridges between networks), then to the designated target node (i.e., the final destination for file 232). Commands 238 represent a plurality of file transfer commands that correspond to the computer nodes associated with node addresses 236. In other words, each command in commands 238 is a set of instructions that corresponds to a particular computer node in path 240 for executing the transfer of file 232 from that particular computer node to a next computer node in path 240. It should be noted that as each particular computer node in path 240 transfers file 232 to a next computer node in path 240, that particular computer node removes its corresponding node address and command from file transfer command record 234.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Transfer of files between network computers, nodes, machines, systems, or devices is often desired or required.

Currently, standard file transfer protocols exist. However, these current standard file transfer protocols do not allow file transfer between computer nodes that are located on different networks.

In a large enterprise, computers are often connected to different networks. In other words, not all of the enterprise's computers are connected together on the same network. In addition, some of the computers may be isolated by a firewall or inside a virtual network, such as virtual machines in a virtualized computer environment. In such computer environments, manual operations are required to transfer a file from one computer on one network to another computer on a different network. Frequently, these manual operations involve moving the file between adjacent computers until a specific target computer is finally reached. Another challenge using these manual operations is possible lack of information regarding which computers and/or network protocols can be used to reach the specific target computer.

Illustrative embodiments are capable of transferring files between a plurality of computers that are not directly connected within the same network. Further, illustrative embodiments allow the transfer of files between designated computers having heterogeneous operating systems. Furthermore, illustrative embodiments allow the transfer of files using a plurality of different file transfer protocols.

Illustrative embodiments build a file transfer virtual network table or map based on discovered network connections and file transfer protocol information and share this table with other registered computers that utilize illustrative embodiments. Using illustrative embodiments, each computer performs an initial discovery of available network connections and computers present on one or more networks that each particular computer is connected to. Then, each computer shares this discovered available connection and computer information with other computers in the same network and computers in other networks if that particular computer is connected to two or more networks. Each computer uses this information to generate a global file transfer virtual network table that includes all computers and related connections, along with their respective networks and file transfer protocols. When a computer needs to transfer a file to another computer on another network, the computer searches the global file transfer virtual network table for the computer that is the target of the file transfer. If the computer finds the target computer in the table, then the computer identifies one or more intermediate computers in the table and uses these intermediate computers to reach the target system on the different network.

For each computer that potentially involves a file transfer operation, illustrative embodiments utilize a file transfer discovery agent on each computer to discover and record available network connection information. The file transfer discovery agent performs this discovery on each network connection. Thus, if more network cards are present on a computer, then the file transfer discovery agent performs the discovery operation on each network connected to that computer.

For each computer in a network, the file transfer discovery agent only collects basic information, such as file transfer protocol and operating system type used by each particular computer. The file transfer discovery agent may utilize any currently available network discovery tools to perform the network discovery operation. The file transfer discovery agent determines available file transfer protocols by computer operating system types discovered by the network discovery operation. It should be noted that the file transfer discovery agent may determine default file transfer protocols for particular operating system types. However, alternative illustrative embodiments may provide a graphical user interface for a user to associate different file transfer protocols to particular operating system types.

The file transfer discovery agent identifies computers having more than one network connection as a file transfer network bridge system. The file transfer discovery agent records this file transfer network bridge information in the global file transfer virtual network table. The global file transfer virtual network table may be in the form of a light database or an extensible markup language file, for example. The file transfer discovery agent shares its local file transfer virtual network table with the other registered computers. To improve data security, the file transfer discovery agent can encrypt the file transfer virtual network table for transmission to the other registered computers.

In alternative illustrative embodiments, only one specific network scan point computer is used to perform the network discovery operation in each different network. The alternative illustrative embodiments use this one specific network scan point computer to minimize network discovery operations and reduce duplication of data within each network.

Each computer receives a file transfer virtual network table from the other registered computers and merges the information within received file transfer virtual network tables with the information within its own local global file transfer virtual network table. The file transfer discovery agent identifies each file transfer virtual network table with a version number, for example. The file transfer discovery agent shares its file transfer virtual network table with the other registered computers each time the file transfer discovery agent generates a new version of the table. The process starts each time the file transfer discovery agent performs a new network discovery operation or a user, such as a system administrator, changes a network configuration, such as adding or removing a computer or protocol. After an initial setup has run, the global file transfer virtual network table contains all the connection and file transfer protocol information required for illustrative embodiments to build the actual commands to execute the file transfer operations between non-communicating computers, machines, systems, and devices.

With reference now to FIG. 3, a diagram illustrating an example of a file transfer system is depicted in accordance with an illustrative embodiment. File transfer system 300 is a system of software and hardware components for transferring files between computer nodes located on different networks. File transfer system 300 may be implemented in a network of data processing systems, such as network data processing system 100 in FIG. 1.

In this example, file transfer system 300 includes user system 302, source computer system 304, target computer system 306, target computer system 308, file transfer network bridge computer system A 310, file transfer network bridge computer system B 312, protocol bridge computer system 314, enterprise network A 316, enterprise network B 318, and isolated network 320. However, it should be noted that file transfer system 300 is only meant as an example and not as a limitation on illustrative embodiments. In other words, file transfer system 300 may include any number of computer systems, networks, and other devices not shown.

User computer system 302 may be, for example, client 110 in FIG. 1. Source computer system 304 may be, for example, server 104 in FIG. 1. Also, file transfer network bridge computer system A 310 may be, for example, a file transfer protocol server, such as server 106 in FIG. 1.

In this example, source computer system 304 and target computer systems 306 and 308 are located on different networks. For example, source computer system 304 is connected to enterprise network A 316, target computer system 306 is connected to isolated network 320, and target computer system 308 is connected to enterprise network B 318. Enterprise network A 316 may be, for example, a WAN and enterprise network B 318 may be, for example, a LAN. Isolated network 320 may be isolated behind a firewall, for example.

In this example, a user, such as a system administrator or other individual, using user computer system 302 initiates a file transfer operation between source computer system 304 and target computer systems 306 and 308. Because source computer system 304 and target computer systems 306 and 308 are located on different networks (i.e., enterprise network A 316, isolated network 320, and enterprise network B 318, respectively), illustrative embodiments utilize file transfer bridge computer system A 310 and file transfer network bridge computer system B 312 to perform "staged" file transfer operations for transferring file 322 from source computer system 304 to target computer systems 306 and 308.

Moreover, the computer systems involved in the transfer of file 322 may use different file transfer protocols. As a result, illustrative embodiments must be capable of discovering all of the different file transfer protocols used by the different computer systems and determine whether a common file transfer protocol exists between two adjacent computer systems in the file transfer node path. Further, for each specific file transfer protocol, illustrative embodiments must be capable of determining the direction (e.g., put or get) of the file transfer since only one direction may be available.

If a common file transfer protocol does not exist between source computer system 304 and target computer systems 306 and 308, then illustrative embodiments utilize file transfer bridge computer system A 310 and file transfer network bridge computer system B 312 to perform the staged file transfer operation using a protocol common to source computer system 304 and target computer systems 306 and 308. For example, file transfer network bridge computer system A 310 may utilize protocol bridge computer system 314 to temporarily store file 322 using a file transfer protocol client (i.e., put), which can be later retrieved by a different operating system on target computer system 306 using a secure copy protocol client (i.e., get).

It should be noted that a file transfer may be initiated from any computer system that utilizes illustrative embodiments. Illustrative embodiments may provide either a command-line interface or a graphical user interface capable of operating on any computer system utilizing illustrative embodiments. The interface implements a simple syntax to perform a user-desired file transfer operation. The following are two examples of command-line interface syntax:

"get" to copy a file from a remote source system to a local virtual target system:
  get <filename> <remote system hostname>:<source path> <ask required credentials.

"put" to copy a file from a local virtual source system to a remote target system:
  put <filename> <remote system hostname>:<absolute path> <ask required credentials.

The following example describes steps to perform a file transfer using a graphical user interface of illustrative embodiments. From a graphical user interface console, a user opens a file transfer shell and selects a local file for transfer, a target computer system, and a file transfer node path. A file transfer discovery agent located on the source computer system searches a local file transfer virtual network table and calculates a file transfer node path to the target computer system based on information in the local file transfer virtual network table. If the file transfer discovery agent identifies more than one file transfer node path to the target computer system, then the file transfer discovery agent displays all of the file transfer node path options to the user in the graphical user interface console.

Subsequently, the user selects one of the displayed file transfer node path options and provides the credentials required to access each computer system in the selected file transfer node path. In addition, the file transfer discovery agent generates a file transfer command record listing actual file transfer commands, along with their corresponding computer systems where each respective file transfer command must be executed to transfer the file from that particular computer system to a next computer system in the selected file transfer node path. The file transfer discovery agent removes and executes the first command in the file transfer command record and sends the shortened file transfer command record to the next computer system in the selected file transfer node path, along with the actual file, such as file 322, to be transferred. The file transfer discovery agent copies the file transfer command record into a configurable default directory. In this example where the next computer system in the selected file transfer node path (e.g., target computer system 306) is behind a "one way" firewall, the file transfer discovery agent only sends a file transfer command record that contains a "get" command to retrieve the file from the originating computer system (e.g., file transfer network bridge computer system A 310).

The file transfer discovery agent on an intermediate computer system node receives the file and opens the file transfer command record. The intermediate computer system node removes and executes the file transfer command corresponding to that particular intermediate computer system node to send the file to the next intermediate computer system node in the path or to the target computer system node. The process completes when the file reaches the last file transfer network bridge computer system, which performs the last file transfer to the target computer system node.

The file transfer discovery agent dynamically builds the file transfer command record based on the available connection information between source and target computer systems contained in the local file transfer virtual network table. Once the user selects one of the displayed file transfer node paths in the graphical user interface console, the file transfer discovery agent builds the file transfer command record containing all file transfer commands to be executed on each specific computer system in the selected file transfer node path. The file transfer discovery agent selects the file transfer commands (e.g., file transfer protocol commands, secure copy protocol commands, net use commands, and the like) based on file transfer protocols used by adjacent computer system in the selected file transfer node path. Similar to internet protocol, the file transfer discovery agent encapsulates each file transfer command in the file transfer command record so that each computer system involved in the file transfer can remove or strip its corresponding file transfer command from the file transfer command record as the file transfer command record travels from that particular computer system to a next computer system in the selected file transfer node path.

Figure 4:
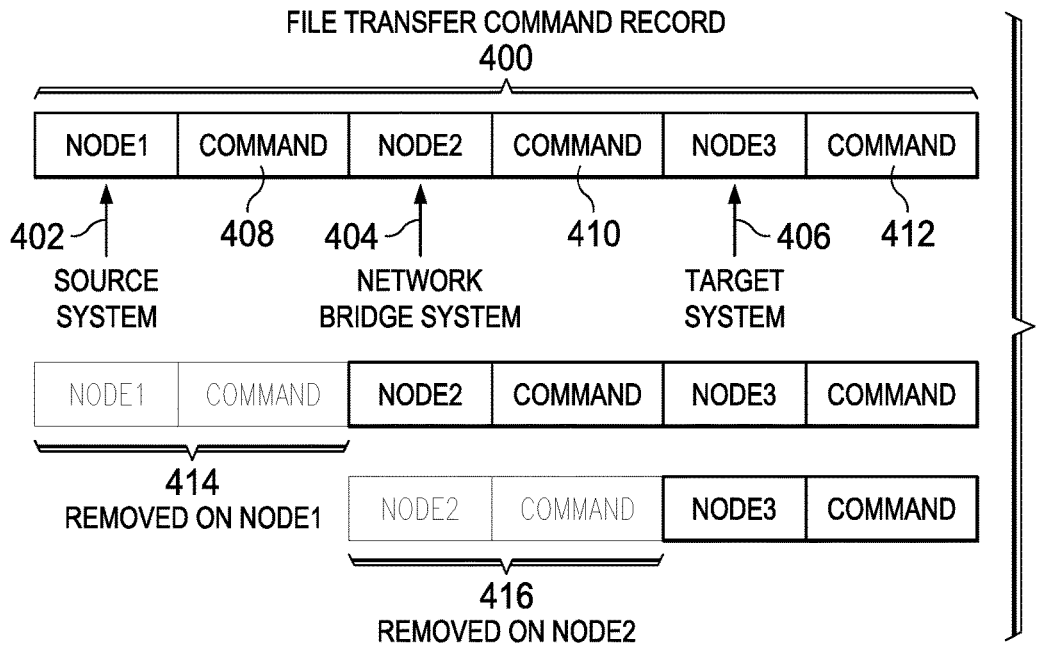
FIG. 4 is a diagram illustrating an example of a file transfer command record in accordance with an illustrative embodiment.

With reference now to FIG. 4, a diagram illustrating an example of a file transfer command record is depicted in accordance with an illustrative embodiment. File transfer command record 400 may be, for example, file transfer command record 232 in FIG. 2. Illustrative embodiments utilize file transfer command record 400 to perform a file transfer between computer nodes located on different networks.

In this example, file transfer command record 400 includes identification of source computer system 402, which is "Node1", network bridge computer system 404, which is "Node2", and target computer system 406, which is "Node3". The identification may be, for example, an address, such as an internet protocol address, that corresponds to source computer system 402, network bridge computer system 404, and target computer system 406. Source computer system 402 may be, for example, source computer system 304 in FIG. 3. Network bridge computer system 404 may be, for example, file transfer network bridge computer system A 310 in FIG. 3. Target computer system 406 may be, for example, target computer system 306 in FIG. 3. Source computer system 402, network bridge computer system 404, and target computer system 406 represent a file transfer node path, such as path 234 in FIG. 2, for transferring a file, such as file 322 in FIG. 3, from source to target using an intermediate network bridge node between networks in the file transfer node path. However, it should be noted that file transfer command record 400 may include any number of intermediate and target nodes, as well as the corresponding file transfer commands.

Command 408, command 410, and command 412 may be, for example, command 238 in FIG. 2. Command 408, command 410, and command 412 each represent a separate set of executable instructions for transferring the file from one particular computer node to another specified computer node in the file transfer node path. In this example, command 408 corresponds to source computer system 402, command 410 corresponds to network bridge computer system 404, and command 412 corresponds to target computer system 406.

At 414, Node1 source computer system 402 removes an element or segment, which contains the identification of Node1 source computer system 402 and corresponding command 408, from file transfer command record 400 prior to sending abridged file transfer command record 400 to Node2 network bridge computer system 404. It should be noted that the order of elements (i.e., node address and corresponding command) in file transfer command record 400 corresponds to the order of respective computer systems in the file transfer node path. Similarly, at 416, Node2 network bridge computer system 404 removes another element or segment, which contains the identification of Node2 network bridge computer system 404 and corresponding command 410, from file transfer command record 400 prior to sending further abridged file transfer command record 400 to Node3 target computer system 406.

Figure 5:
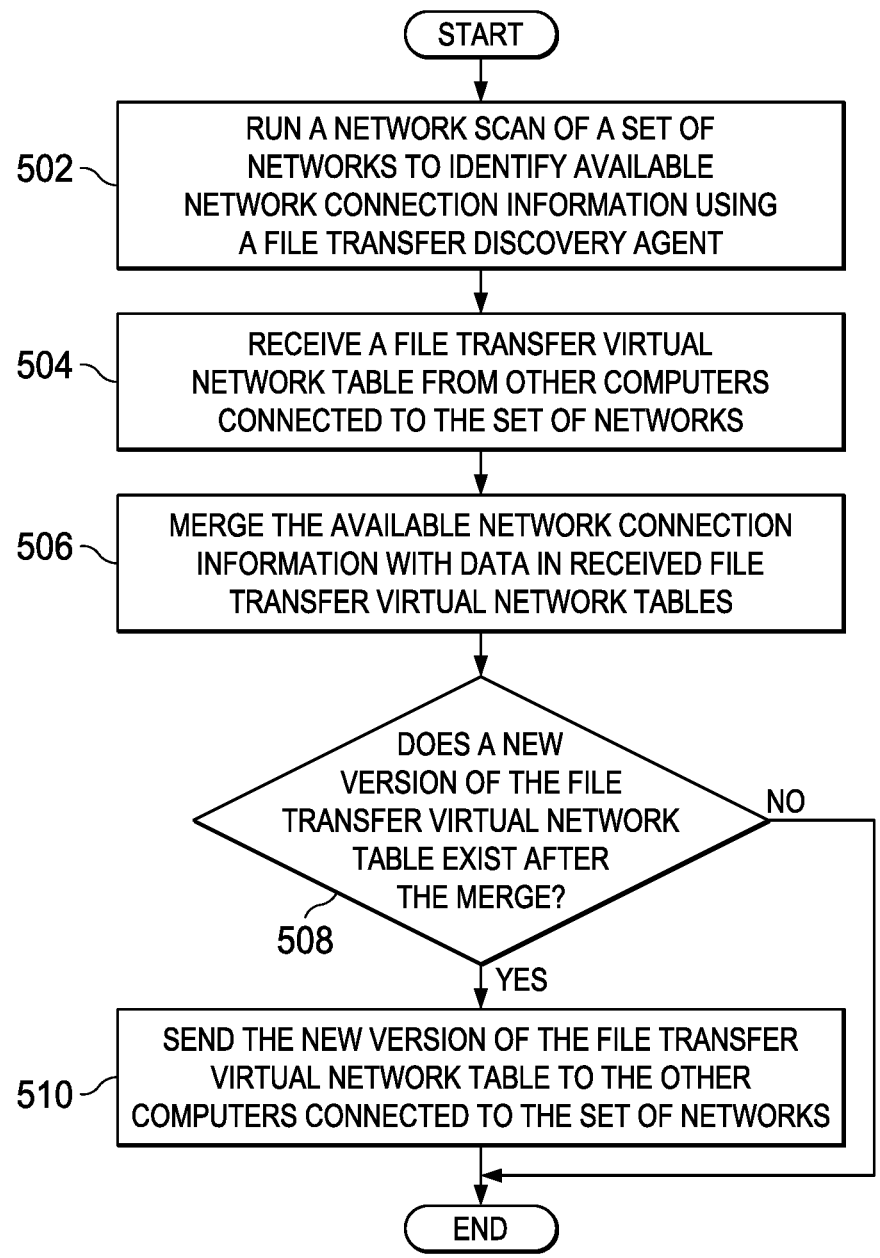
FIG. 5 is flowchart illustrating a process for generating a file transfer virtual network table in accordance with an illustrative embodiment.

With reference now to FIG. 5, a flowchart illustrating a process for generating a file transfer virtual network table is shown in accordance with an illustrative embodiment. The process shown in FIG. 5 may be implemented in a computer, such as, for example, server 106 or client 112 in FIG. 1 or data processing system 200 in FIG. 2.

The process begins when the computer runs a network scan on a set of one or more networks connected to the computer to identify available network connection information using a file transfer discovery agent on the computer (step 502). In addition, the computer receives a file transfer virtual network table from other computers connected to the computer via the set of one or more networks (step 504). Further, the computer merges the available network connection information identified in the network scan with data in the file transfer virtual network table received from the other computers (step 506).

The computer makes a determination as to whether a new version of the file transfer virtual network table exists after the merge (step 508). If the computer determines that a new version of the file transfer virtual network table does not exist after the merge, no output of step 508, then the process terminates thereafter. If the computer determines that a new version of the file transfer virtual network table does exist after the merge, yes output of step 508, then the computer sends the new version of the file transfer virtual network table to the other computers connected to the computer via the set of one or more networks (step 510). Thereafter, the process terminates.

Figure 6:
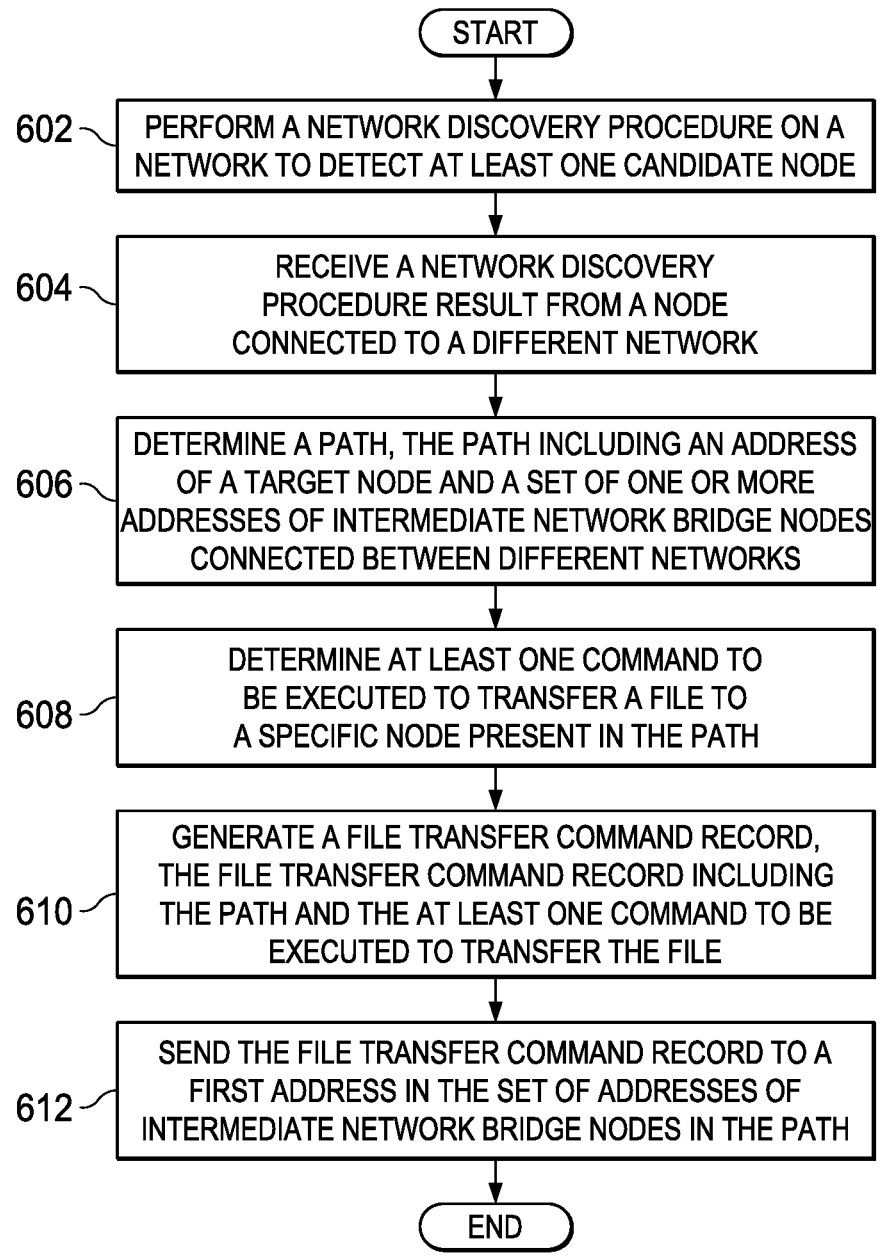
FIG. 6 is flowchart illustrating a process for coordinating a transfer of a file to a target node in accordance with an illustrative embodiment.

With reference now to FIG. 6, flowchart illustrating a process for coordinating a transfer of a file to a target node is shown in accordance with an illustrative embodiment. The process shown in FIG. 6 may be implemented in a computer, such as, for example, server 104 or client 114 in FIG. 1 or data processing system 200 in FIG. 2.

The process begins when the computer performs a network discovery procedure on a network to detect at least one candidate node for transfer of the file (step 602). The file may be, for example, a computer file, such as file 322 in FIG. 3. The computer also receives a network discovery procedure result from a node connected to a different network (step 604). The computer determines a path, the path including an address of a target node and a set of one or more addresses of intermediate network bridge nodes connected between different networks based on one of the performed network discovery procedure by the computer or the network discovery procedure result received from the node connected to the different network (step 606). It should be noted that the target node is not on a same network as the computer.

The computer determines at least one command to be executed to transfer the file from the computer to a specific node present in the path (step 608). The computer generates a file transfer command record, the file transfer command record including the path and the at least one command to be executed to transfer the file (step 610). The computer sends the file transfer command record to a first address in the set of addresses of intermediate network bridge nodes in the path (step 612). Thereafter, the process terminates.

Figure 7:
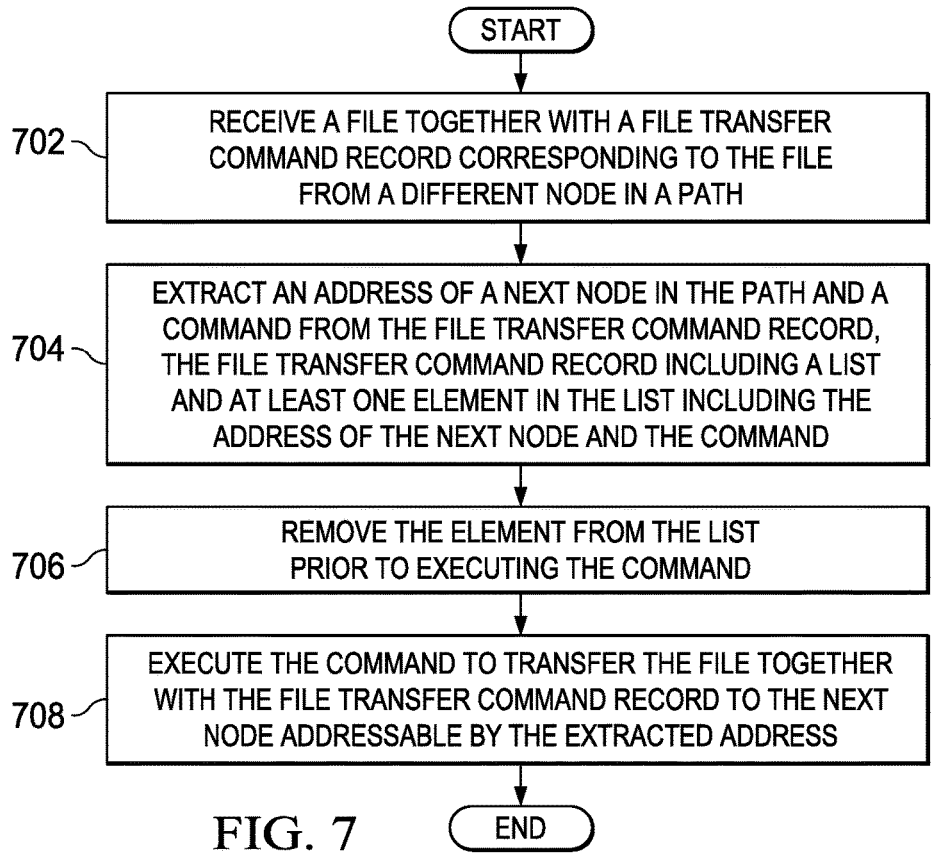
FIG. 7 is a flowchart illustrating a process for forwarding a file to a target node in accordance with an illustrative embodiment.

With reference now to FIG. 7, a flowchart illustrating a process for forwarding a file to a target node is shown in accordance with an illustrative embodiment. The process shown in FIG. 7 may be implemented in a computer, such as, for example, server 106 or client 110 in FIG. 1 or data processing system 200 in FIG. 2.

The process begins when the computer receives a file together with a file transfer command record corresponding to the file from a node in a path, the path including an address of a target node and a set of one or more addresses of intermediate network bridge nodes between networks (step 702). The file may be, for example, a computer file, such as file 322 in FIG. 3. The computer extracts an address of a next node in the path and a command from the file transfer command record, the file transfer command record including a list and at least one element in the list including the address of the next node and the command (step 704).

The computer removes the element from the list prior to executing the command (step 706). The computer executes the command to transfer the file together with the file transfer command record to the next node addressable by the extracted address (step 708). Thereafter, the process terminates.

Thus, illustrative embodiments of the present invention provide a computer-implemented method, computer system, and computer program product for transferring files between computer nodes located on different networks. Illustrative embodiments utilize file transfer discovery agents whose logic analyzes characteristics and attributes of reachable networks and the types of operating systems running on each of the computers, machines, systems, or devices in the reachable networks. The automatic analysis of the information provided by the network discovery scan operation identifies computers that illustrative embodiments can utilize as network vehicles for the transfer of files that cannot be moved from source computer to target computer directly. Using these identified network vehicle computers to transfer files, illustrative embodiments overcome network and computer limitations by identifying those computer systems that can bridge between networks in the file transfer process and providing file transfer between computer systems having different operating system types. Thus, illustrative embodiments provide a technical solution to file transfer between non-communicating computer systems not previously addressed by current file transfer solutions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transferring files between computer nodes located on different networks, the method comprising:
   determining a path for transferring a file to a target node located on a different network, the path including an address of the target node and a set of one or more addresses of intermediate network bridge nodes connecting the different networks;
   determining at least one command to be executed to transfer the file to a specific node present in the path; and
   generating a file transfer command record, the file transfer command record including the path and the at least one command to be executed to transfer the file to the specific node present in the path, wherein the file transfer command record comprises a list, at least one element of the list includes a pair of an address of a next node in the path and a corresponding command to be executed to transfer the file to the next node, wherein another element of the list includes another pair of another address of another next node in the path and a corresponding next command to be executed to transfer the file to the another next node, and wherein element order of elements in the list of the file transfer command record corresponds to an order of respective nodes in the path including the address of the target node and the set of one or more addresses of the intermediate network bridge nodes connecting the different networks.

2. The method of claim 1 further comprising:
   performing a network discovery procedure on a network to detect at least one candidate node for transfer of the file to the target node located on the different network, wherein the determining of the path for the transferring of the file to the target node located on the different network is based on a result of the network discovery procedure.

3. The method of claim 1 further comprising:
   receiving a network discovery procedure result from a node connected to the different network, wherein the determining of the path for the transferring of the file to the target node located on the different network is based on the received network discovery procedure result from the node connected to the different network.

4. The method of claim 1 further comprising:
   obtaining a different file transfer command record corresponding to a different file;
   extracting an address of a next node in a different path and a corresponding command from the different file transfer command record, wherein the different file transfer command record includes a list and at least one element in the list includes the address of the next node and the corresponding command; and
   executing the corresponding command to transfer the different file together with the different file transfer command record to the next node addressable by the extracted address.

5. The method of claim 4 further comprising:
   removing the element including the corresponding command to be executed to transfer the file to the next node from the list prior to executing the corresponding command, where executing the corresponding command is performed responsive to removing the element.

6. The method of claim 4, wherein the obtaining of the different file transfer command record comprises receiving the different file together with the different file transfer command record from a different node of the different path.

7. The method of claim 1 further comprising:
   running a network scan on a set of networks coupled to a given node to identify available network connection information using a file transfer discovery agent;
   receiving file transfer virtual network tables from nodes connected to the set of networks, wherein the file transfer virtual network tables comprises an identification of an address, operating system type, and protocol used by each of the nodes connected to the set of networks; and
   merging the available network connection information identified in the network scan with data in the file transfer virtual network tables received from the nodes connected to the set of networks.

8. The method of claim 7 further comprising:
   determining whether a new version of a file transfer virtual network table exists after the merging; and
   responsive to determining that a new version of the file transfer virtual network table does exist after the merging, sending the new version of the file transfer virtual network table to the nodes connected to the set of networks.

9. A computer system for transferring files between computer nodes located on different networks, the computer system comprising:
   a bus system;
   a storage device connected to the bus system, wherein the storage device stores program instructions; and a processor connected to the bus system, wherein the processor executes the program instructions to:
determine a path for transferring a file to a target node located on a different network, the path including an address of the target node and a set of one or more addresses of intermediate network bridge nodes connecting the different networks;
determine at least one command to be executed to transfer the file to a specific node present in the path; and
generate a file transfer command record, the file transfer command record including the path and the at least one command to be executed to transfer the file to the specific node present in the path, wherein the file transfer command record comprises a list, at least one element of the list includes a pair of an address of a next node in the path and a corresponding command to be executed to transfer the file to the next node, wherein another element of the list includes another pair of another address of another next node in the path and a corresponding next command to be executed to transfer the file to the another next node, and wherein element order of elements in the list of the file transfer command record corresponds to an order of respective nodes in the path including the address of the target node and the set of one or more addresses of the intermediate network bridge nodes connecting the different networks.

10. The computer system of claim 9, wherein the processor further executes the program instructions to:
perform a network discovery procedure on a network to detect at least one candidate node for transfer of the file to the target node located on the different network, wherein determining the path for the transferring of the file to the target node located on the different network is based on a result of the network discovery procedure.

11. The computer system of claim 9, wherein the processor further executes the program instructions to:
receive a network discovery procedure result from a node connected to the different network, wherein determining the path for the transferring of the file to the target node located on the different network is based on the received network discovery procedure result from the node connected to the different network.

12. A computer program product for transferring files between computer nodes located on different networks, the computer program product comprising a computer readable storage medium having program instructions embodied therewith, the program instructions executable by a computer to cause the computer to perform a method comprising:
determining a path for transferring a file to a target node located on a different network, the path including an address of the target node and a set of one or more addresses of intermediate network bridge nodes connecting the different networks;
determining at least one command to be executed to transfer the file to a specific node present in the path; and
generating a file transfer command record, the file transfer command record including the path and the at least one command to be executed to transfer the file to the specific node present in the path, wherein the file transfer command record comprises a list, at least one element of the list includes a pair of an address of a next node in the path and a corresponding command to be executed to transfer the file to the next node, wherein another element of the list includes another pair of another address of another next node in the path and a corresponding next command to be executed to transfer the file to the another next node, and wherein element order of elements in the list of the file transfer command record corresponds to an order of respective nodes in the path including the address of the target node and the set of one or more addresses of the intermediate network bridge nodes connecting the different networks.

13. The computer program product of claim 12 further comprising:
performing a network discovery procedure on a network to detect at least one candidate node for transfer of the file to the target node located on the different network, wherein the determining of the path for the transferring of the file to the target node located on the different network is based on a result of the network discovery procedure.

14. The computer program product of claim 12 further comprising:
receiving a network discovery procedure result from a node connected to the different network, wherein the determining of the path for the transferring of the file to the target node located on the different network is based on the received network discovery procedure result from the distant node.

15. The method of claim 1 further comprising:
sending the file transfer command record to nodes connected to a set of networks operatively coupled to a computer performing the sending.

16. The computer system of claim 9 further comprising:
run a network scan on a set of networks operatively coupled to the computer system to identify available network connection information using a file transfer discovery agent executing on the computer system;
receive file transfer virtual network tables from nodes connected to the set of networks, wherein the file transfer virtual network tables comprises an identification of an address, operating system type, and protocol used by each of the nodes connected to the set of networks;
merge the available network connection information identified in the network scan with data in the file transfer virtual network tables received from the nodes connected to the set of networks;
determining whether a new version of a file transfer virtual network table exists after the merging; and
responsive to determining that a new version of the file transfer virtual network table does exist after the merging, sending the new version of the file transfer virtual network table to the nodes connected to the set of networks.

17. The computer program product of claim 12 further comprising:
running a network scan on a set of networks operatively coupled to the computer to identify available network connection information using a file transfer discovery agent executing on the computer system;
receiving file transfer virtual network tables from nodes connected to the set of networks, wherein the file transfer virtual network tables comprises an identification of an address, operating system type, and protocol used by each of the nodes connected to the set of networks;

merging the available network connection information identified in the network scan with data in the file transfer virtual network tables received from the nodes connected to the set of networks;

determining whether a new version of a file transfer virtual network table exists after the merging; and responsive to determining that a new version of the file transfer virtual network table does exist after the merging, sending the new version of the file transfer virtual network table to the nodes connected to the set of networks.

\* \* \* \* \*